United States Patent Office 2,734,054

Patented Feb. 7, 1956

2,734,054

PRODUCTION OF L-LYXOFLAVIN AND INTERMEDIATES THEREFOR

Edward Wenis, Leonia, N. J., assignor to Hoffmann-La Roche Inc., Nutley, N. J., a corporation of New Jersey No Drawing. Application February 23, 1952, Serial No. 273,161

7 Claims. (Cl. 260—193)

This invention relates to a process for producing L-lyxoflavin and to novel intermediates employed therein.

In general, the process involves reductively condensing L-lyxose with 4,5-dimethylaniline to form N-(L-lyxityl)-4,5-dimethylaniline (which can be alternatively designated as L-lyxityl xylidine), coupling the latter compound with diazotised aniline to form 2'-L-lyxitylamino-4',5'-dimethylazobenzene, (which can be alternatively designated as N-(L-lyxityl)-2-phenylazo-4,5-dimethylaniline), and converting the latter to L-lyxoflavin by (1) reacting it with barbituric acid, or (2) catalytically reducing it to N-(L-lyxitylamino)-2-amino-4,5-dimethylbenzene and condensing the hydrochloride of the last mentioned compound with alloxantin.

The reductive condensation is carried out by hydrogenation of the L-lyxose and 4,5-dimethylaniline in the presence of a hydrogenation catalyst, for example, Raney nickel catalyst. The reaction between the 2'-L-lyxitylamino-4',5'-dimethylazobenzene with barbituric acid is advantageously carried out in a weak acid medium, for example, acetic acid.

The following examples will illustrate the method of producing the new intermediates and L-lyxoflavin:

*Example 1*

One liter of an aqueous solution containing 19.3 grams of L-lyxose was mixed with 15.6 grams of 4,5-dimethylaniline in 500 cc. of ethanol. The pH was adjusted to 4 with hydrochloric acid, and the reduction was carried out at 80° C. for six hours with hydrogen under 900 lbs./sq. inch of pressure in the presence of 40 grams of Raney nickel catalyst. On filtration, concentration of the filtrate under vacuum to 400 cc., and cooling, L-lyxityl xylidine crystallized. Further concentration of the mother liquors under vacuo gave small additional fractions of crystals. Upon repeated recrystallization of the product from water, it melted at 141–142° C.

10 grams of L-lyxityl xylidene were dissolved in 150 cc. of water containing 40 cc. of N hydrochloric acid. The solution was adjusted to pH 3 with sodium acetate solution. Aniline (3.7 grams) was diazotized in 156 cc. of N hydrochloric acid with a solution of 2.73 grams of sodium nitrite in 100 cc. of water at 5–10° C. The resulting solution of diazotized aniline and the L-lyxityl xylidene solution were mixed and held at 0–10° C. while slowly adding 2 N sodium acetate for one hour. The initial pH was 0.95 and rose to 3.5 during the hour. The reaction was continued at pH 3.5 for an additional four hours with stirring. During this time more sodium acetate was added to maintain the pH at 3.5. A few drops of octyl alcohol were added at the beginning of the reaction to prevent foaming. After standing at 4° C. for about 16 hours, the precipitate was filtered off, washed with water, and dried. On recrystallization from alcohol-water, a product was obtained which melted at 120–122° C. with decomposition. Recrystallization from chlorobenzene gave 2'-L-lyxitylamino-4',5'-dimethylazobenzene, M. P. 170–171° C.

A solution made up of 42.6 grams of 2'-L-lyxitylamino-4',5'-dimethylazobenzene, 320 cc. of dioxane, 64.5 cc. of acetic acid, and 25.6 grams of barbituric acid was refluxed for 24 hours with stirring. A solid product which formed in the reaction mixture was filtered off and an equal volume of water was added to the filtrate. On cooling, crude L-lyxoflavin separated, M. P. 254–255° C. 14 grams of the crude lyxoflavin were extracted with 300 cc. of boiling water. The residue was re-extracted with 700 cc. of boiling water. The resulting residue had a M. P. of 271–272° C. This was extracted three times at 50° C. with 5% acetic acid solution. The extracts were discarded and about one gram of the residue was recrystallized twice from 600 volumes of boiling water after concentrating the solutions to two-thirds volume before cooling for crystallization each time. On drying, L-lyxoflavin [6,7-dimethyl-9-(1-L-lyxityl)isoalloxazine] was obtained in the form of yellow-orange needles, M. P. 277–278° C.

*Example 2*

10 grams of 2'-L-lyxitylamino-4',5'-dimethylazobenzene were dissolved in 150 cc. of ethanol containing 250 mg. platinum oxide catalyst and reduced with hydrogen under 50 lbs./sq. inch pressure at 28° C. for one hour. The resulting solution was filtered off while hot from the catalyst. The filtrate was then concentrated to 75 cc., and the concentrate on cooling deposited N-(L-lyxitylamino)-2-amino-4,5-dimethylbenzene. The product was dissolved in 150 cc. of hot ethanol and 2.5 cc. of 9.6 N hydrogen chloride-ethanol were added. The solution was concentrated to 50 cc. and some tarry material precipitated on addition of 10 cc. of ether. The solution was decanted from the tar, and on further addition of 50 cc. of ether, N-(L-lyxitylamino)-2-amino-4,5-dimethylbenzene hydrochloride precipitated. The compound was sludged with 50 cc. of cold ethanol, filtered, and then extracted with 100 cc. of hot ethanol. The hydrochloride melted at 172° C.

4 grams of N-(L-lyxitylamino)-2-amino-4,5-dimethylbenzene hydrochloride were heated under reflux for one hour in 100 cc. of 95% ethanol containing 4.2 grams of alloxantin. The reaction mixture was cooled to 40° C. and filtered to yield crude L-lyxoflavin. The crude product was extracted twice with 100 cc. portions of boiling ethanol and twice with 100 cc. portions of boiling water, and the residue recrystallized twice from 1,600 cc. portions of hot water. The crystals were dried, and the L-lyxoflavin thus obtained melted at 278° C.

I claim:

1. A process which comprises reductively condensing L-lyxose with 4,5-dimethylaniline so as to produce N-(L-lyxityl)-4,5-dimethylaniline, coupling the latter compound with diazotized aniline at a pH of about 3.5 so as to produce 2'-L-lyxitylamino-4',5'-dimethylazobenzene, and treating the last named compound with a member of the group consisting of (1) barbituric acid and (2) hydrogen and alloxantin so as to produce L-lyxoflavin.

2. A process which comprises reductively condensing L-lyxose with 4,5-dimethylaniline so as to produce N-(L-lyxityl)-4,5-dimethylaniline.

3. A process which comprises coupling N-(L-lyxityl)-4,5-dimethylaniline with diazotized aniline at a pH of about 3.5 so as to produce 2'-L-lyxitylamino-4',5'-dimethylazobenzene.

4. A process which comprises reacting 2'-L-lyxitylamino-4',5'-dimethylazobenzene with barbituric acid so as to produce L-lyxoflavin.

5. A process which comprises catalytically reducing 2'-L-lyxitylamino-4',5'-dimethylazobenzene to form N-(L-lyxitylamino)-2-amino-4,5-dimethylbenzene and condensing the hydrochloride of the latter with alloxantin so as to produce L-lyxoflavin.

6. N-(L-lyxityl)-4,5-dimethylaniline.

7. 2'-L-lyxitylamino-4',5'-dimethylazobenzene.

References Cited in the file of this patent

UNITED STATES PATENTS

| | | |
|---|---|---|
| 2,261,608 | Tishler | Nov. 4, 1941 |
| 2,350,376 | Tishler | June 6, 1944 |
| 2,370,093 | Tishler et al. | Feb. 20, 1945 |
| 2,384,105 | Lee et al. | Sept. 4, 1945 |

OTHER REFERENCES

Pallares et al.: Arch. of Biochem. v. 22 (1949) pgs. 63–65.

Gardner et al.: Arch. of Biochem. v. 34 (1951) pgs. 98–104.